United States Patent [19]
Ozaki et al.

[11] Patent Number: 5,607,228
[45] Date of Patent: Mar. 4, 1997

[54] ELECTROMAGNETICALLY SHIELDED DISCHARGE-TYPE HEADLAMP

[75] Inventors: Akiyosi Ozaki; Toichiro Shiozawa; Kazuyoshi Suzuki, all of Shizuoka, Japan

[73] Assignee: Koito Manufacturing Co., Ltd., Tokyo, Japan

[21] Appl. No.: 364,272

[22] Filed: Dec. 27, 1994

[30] Foreign Application Priority Data

Dec. 27, 1993 [JP] Japan ................................. 5-331339

[51] Int. Cl.⁶ ................................................. F21V 7/22
[52] U.S. Cl. ........................... 362/263; 362/61; 362/293; 362/376; 427/306
[58] Field of Search ..................... 204/192.14, 192.26; 427/164, 306; 362/61, 80, 263, 265, 293, 327, 376

[56] References Cited

U.S. PATENT DOCUMENTS

| | | | |
|---|---|---|---|
| 3,445,350 | 5/1969 | Klinger et al. | 205/167 |
| 3,650,708 | 3/1972 | Gallagher | 427/306 |
| 4,116,710 | 9/1978 | Heikel | 313/113 |
| 4,272,584 | 6/1981 | Goldberg et al. | 427/306 |
| 4,413,877 | 11/1983 | Suzuki et al. | 204/192.15 |
| 4,590,115 | 5/1986 | Cassat | 427/306 |
| 4,596,239 | 6/1986 | Bauman | 362/204 |
| 5,169,229 | 12/1992 | Hoppert et al. | 362/293 |
| 5,200,272 | 4/1993 | Sirinyan et al. | 427/306 |
| 5,228,766 | 7/1993 | Makita et al. | 362/61 |
| 5,343,370 | 8/1994 | Ohashi et al. | 362/61 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

An automotive headlamp capable of effectively shielding the electromagnetic waves generated by the discharge lamp of a light source and peripheral portions. A conductive layer for shielding electromagnetic waves, which is composed of a durable metallic plating layer, is provided on the surface of the lamp body of the headlamp. With such a shielding layer, a good electromagnetic shielding effect is obtained a long period of time.

5 Claims, 6 Drawing Sheets

5,607,228

ELECTROMAGNETICALLY SHIELDED DISCHARGE-TYPE HEADLAMP

BACKGROUND OF THE INVENTION

The present invention relates to a headlamp for automotive use having a discharge bulb as a light source, and more particularly to an automotive headlamp having a lamp body which is coated with a conductive layer effective for shielding the headlamp to prevent electromagnetic waves generated by the discharge lamp and a feeder connected to the discharge lamp from escaping from the headlamp. It is required to prevent such electromagnetic waves from escaping the headlamp since they can interfere with the radio of the vehicle and affect the operation of other electrical units.

FIG. 8 shows a conventional headlamp of the same general type as that to which the invention pertains. In a container-shaped lamp body "a" there is provided a reflector "d" to which a discharge bulb "c" is attached. A front lens "d" is assembled to a front opening of the lamp body "a". In this way, the headlamp is formed as an integral unit. A unit "e" to which a lighting circuit for activating a high voltage on the discharge bulb "c" is assembled is fixed to a rear opening of the lamp body "a". The bulb "c" is connected with this lighting circuit by a connector "f". On the external surface of the lamp body "a", there is provided a conductive layer (conductive coating film) "g" that is an electromagnetic wave shielding film for preventing electromagnetic waves generated by the discharge bulb "c", the feeder of the discharge bulb, and the connector "f" from leaking outside the lamp body "a".

However, as shown in the enlarged view of FIG. 9, the conventional conductive layer described above is composed of a coating film on which metal pieces "h" are dispersed, so that its overall strength (both heat-resistance and anti-thermal shock property) is low, and further the film thickness is not uniform. The electromagnetic wave shielding effect tends to deteriorate in areas where the film thickness is small, that is, the electromagnetic waves can be transmitted through a region in which the film thickness is small. Therefore, the desired effect of shielding the headlamp from electromagnetic waves transmission cannot be completely obtained.

SUMMARY OF THE INVENTION

The present invention has been achieved in view of the above problems. It is an object of the present invention to provide a headlamp for automotive use which headlamp is coated with a durable conductive film capable of effectively shielding electromagnetic waves generated by the discharge bulb used as a light source and also generated from other members disposed in the vicinity of the discharge bulb.

In order to accomplish the above and other objects, the present invention provides a headlamp for automotive use having a discharge bulb as a light source, the lamp body of which is coated with a conductive layer for shielding the headlamp from electromagnetic waves, characterized in that the conductive layer is composed of a metal plating layer.

The conductive layer composed of a metal plating layer provided on the lamp body surface is superior in heat resistance and anti-thermal shock properties to the conventional conductive coating film. Further, the overall thickness of the conductive layer composed of a metal plating layer is uniform, and thus there is no possibility that electromagnetic waves will leak through the conductive layer. Accordingly, the headlamp can be positively shielded so as to prevent electromagnetic waves generated by the discharge bulb, connector and feeder from escaping.

DESCRIPTION OF THE PREFERRED EMBODIMENTS

With reference to the drawings, an example of a discharge-type headlamp of the present invention will be explained below.

Figure 1:
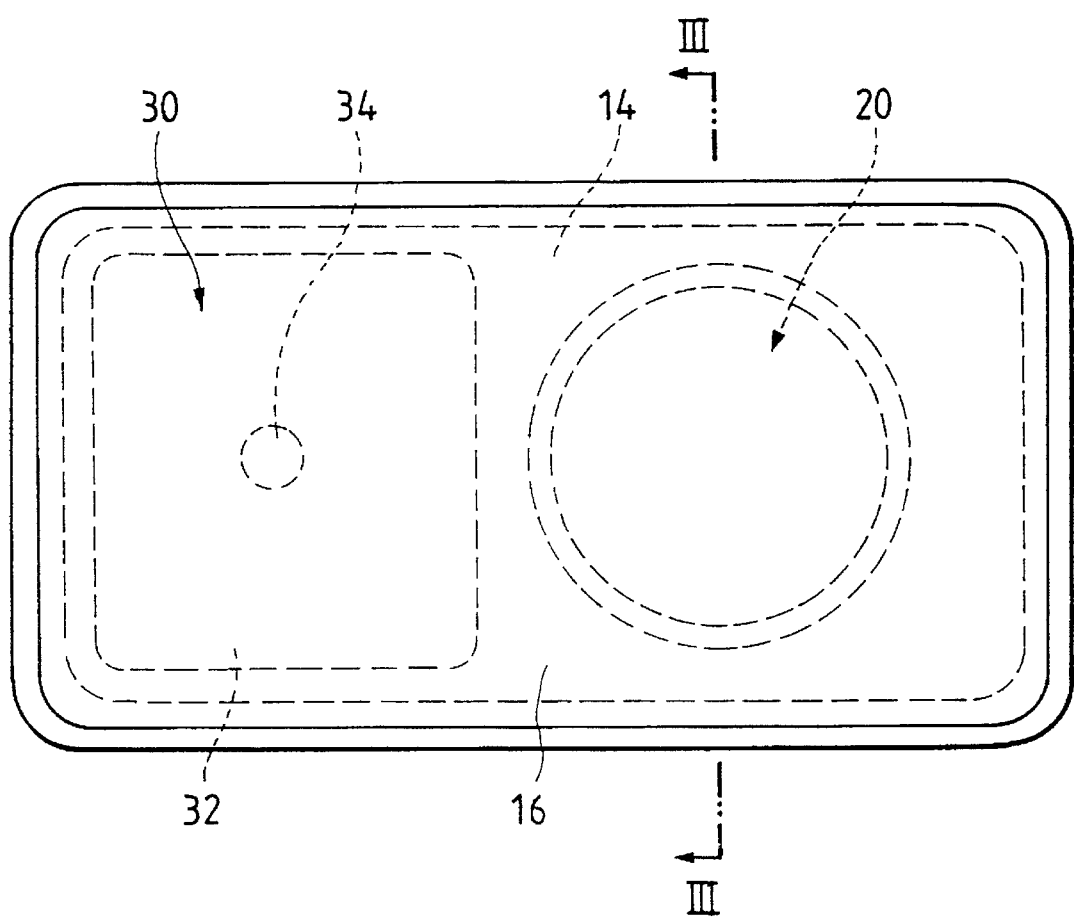
FIG. 1 is a front view of an example of an automotive headlamp constructed in accordance with the present invention.
Figure 2:
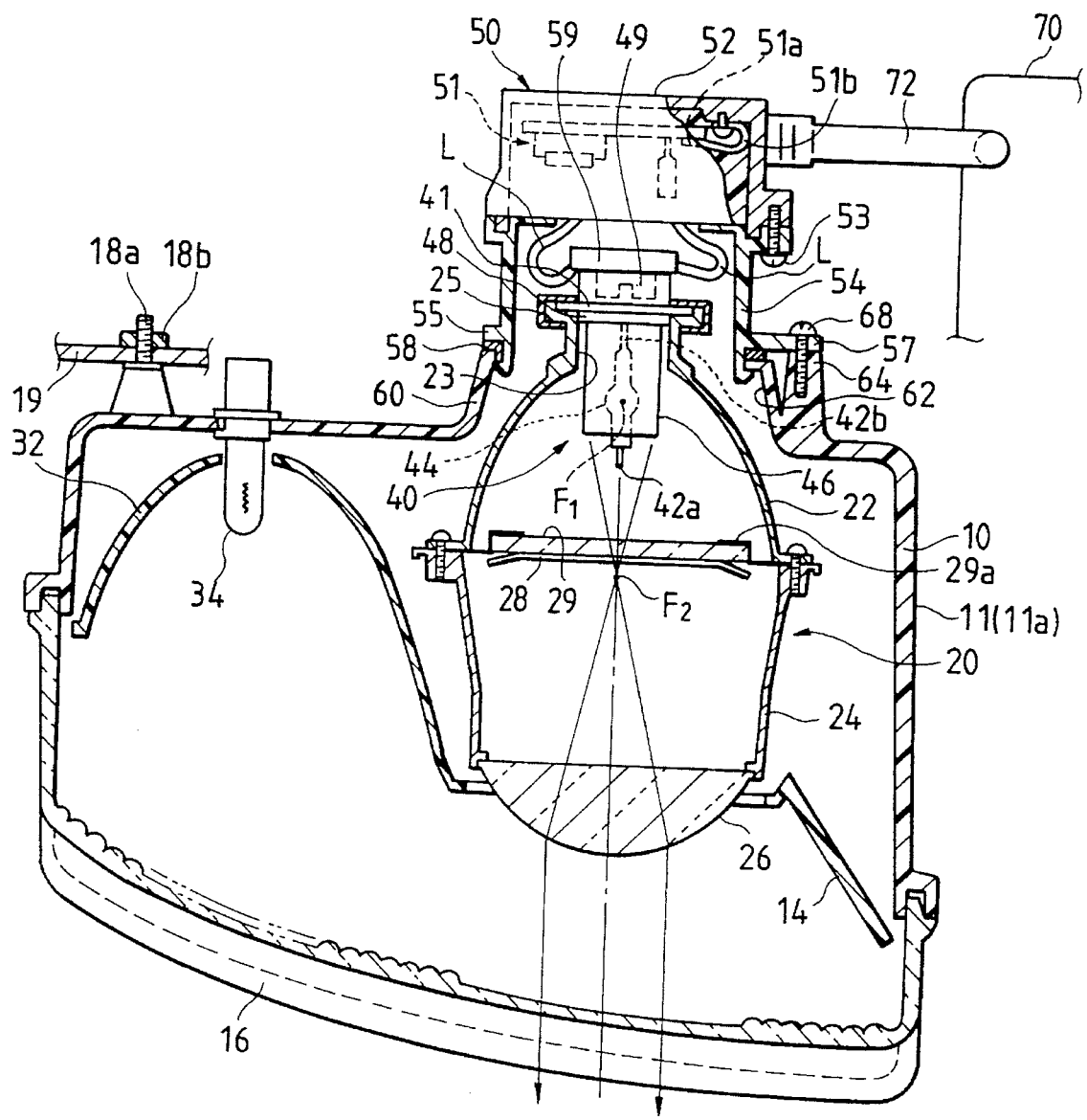
FIG. 2 is a horizontal sectional view of the headlamp.
Figure 3:
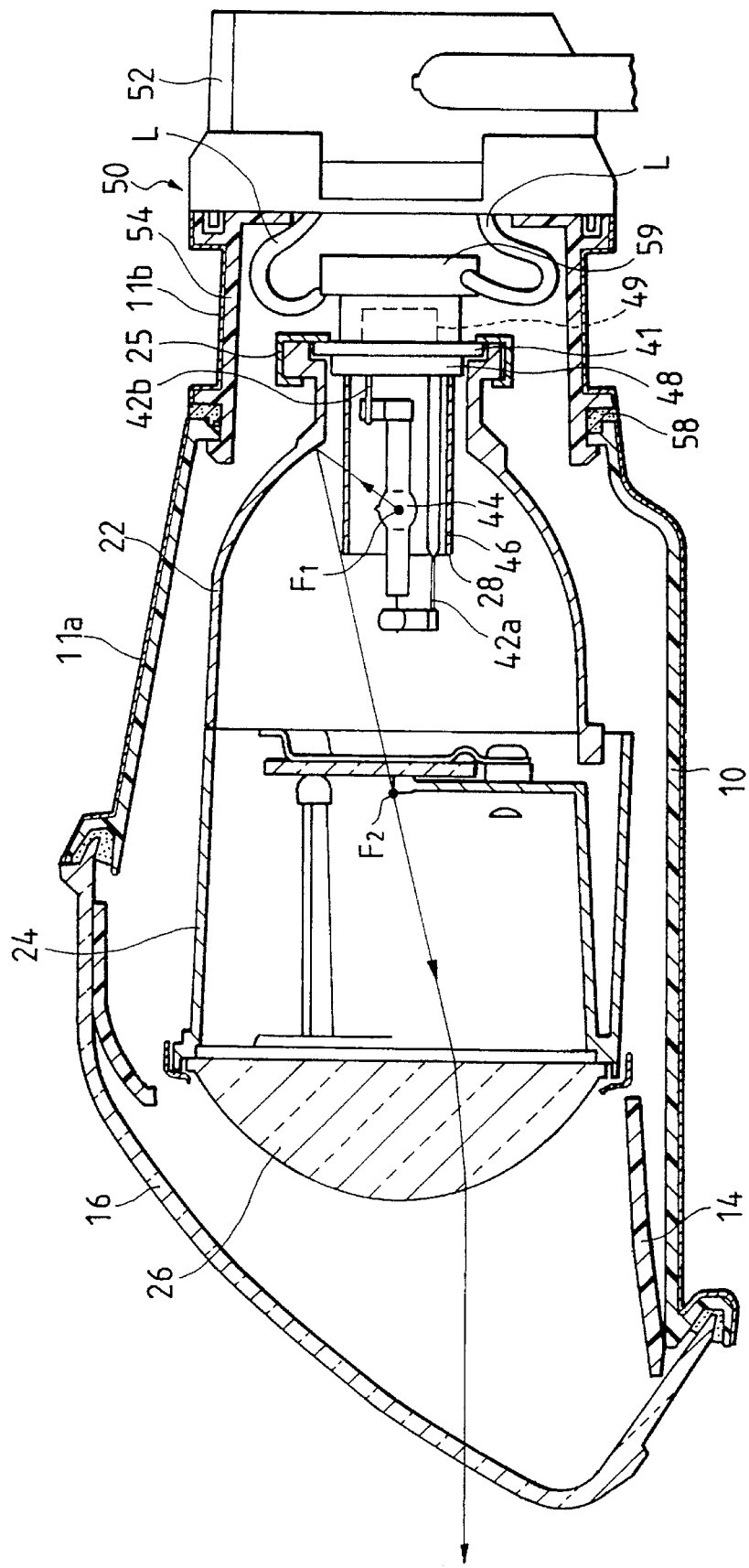
FIG. 3 is a longitudinal sectional view of the headlamp (a sectional view taken along a line III—III in FIG. 1)
Figure 4:
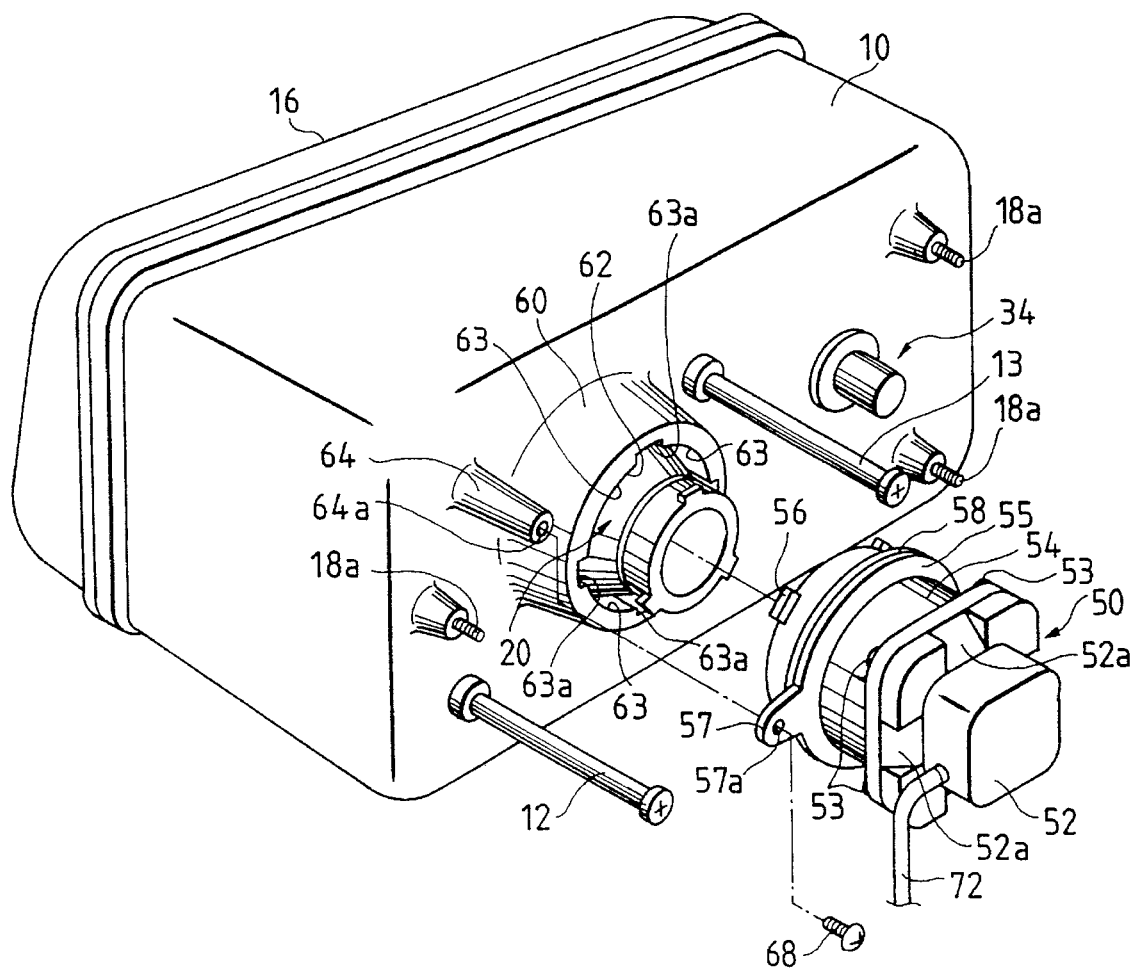
FIG. 4 is a perspective view of the headlamp taken from the rear side.
Figure 5:
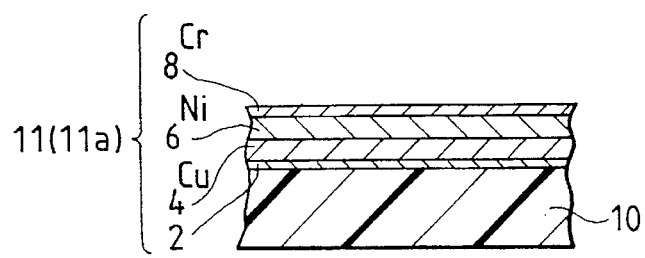
FIG. 5 is an enlarged sectional view of a conductive layer provided on the lamp body surface.
Figure 6:
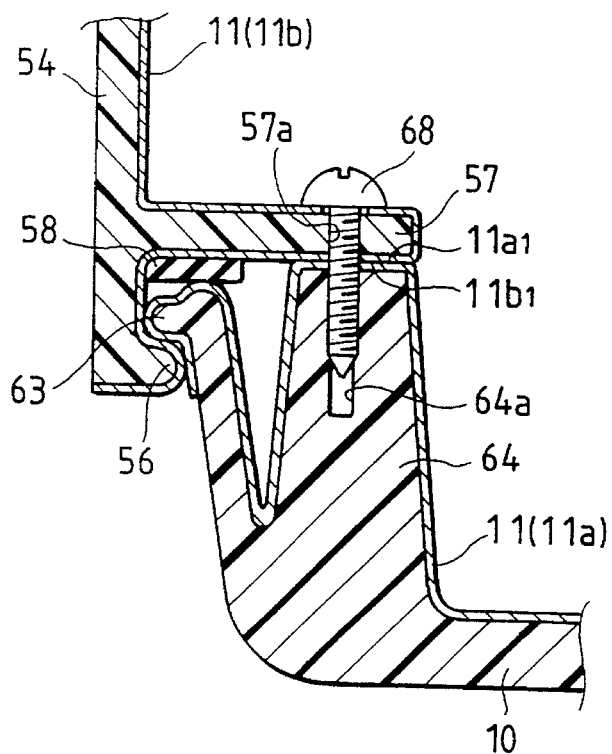
FIG. 6 is a partially enlarged sectional view of a bayonet engaging portion of the lighting circuit accommodation unit and an opening on the lamp body side.

FIGS. 1 to 6 show an example of a headlamp of the present invention. FIG. 1 is a front view of the headlamp, with which a clearance lamp is integrated. FIG. 2 is a horizontal sectional view of the headlamp. FIG. 3 is a longitudinal sectional view of the headlamp taken along a line III—III in FIG. 1. FIG. 4 is a perspective view of the headlamp taken from the rear, wherein the periphery of a lighting circuit accommodation unit is shown in an exploded condition. FIG. 5 is an enlarged sectional view for explaining the structure of the conductive layer formed on the lamp body surface. FIG. 6 is a partially enlarged sectional view of a bayonet engagement portion formed between the lighting circuit unit and the lamp body opening portion.

In these drawings, reference numeral 10 is a container-shaped lamp body made of synthetic resin. A conductive layer 11 (11a) composed of a metal plating layer is formed on the external surface of the lamp body 10 by electrolytic plating. The lamp body 10 is preferably made of a highly formable and heat-resistant thermoplastic resin capable of being subjected to electrolytic plating, the coefficient of linear expansion of which is close to that of a metal plating layer formed on the surface. Examples of usable thermoplastic resins are (Polycarbonate/Acrylonitrile Styrene), PC/ABS alloy mixed with glass fiber, denatured maleimide mixed with glass fiber, and nylon mixed with glass fiber. Instead of glass fiber, material such as alumifisker, mica and talc may be mixed with any of the resins mentioned above.

In order to form a conductive layer (metal plating layer) 11a on the lamp body 10, as illustrated in FIG. 5, first, the surface of the lamp body 10 is subjected to electroless plating. That is, the lamp body 10 is formed with a surface 2 capable of being subjected to electrolytic plating. Next, a copper plating layer 4 is provided by electrolytic plating on the lamp body surface that has been subjected to electroless plating. Then, a corrosion-resistant nickel plating layer 6, which functions as a protective layer for the copper plating layer 4, is provided by electrolytic plating. Finally, a chrome plating layer 8, which functions as a protective layer for the copper plating layer 4 and also functions to improve the appearance of the headlamp, is provided on the nickel plating layer 6.

The headlamp is fixed to a vehicle body by a stud bolt 18a protruding from the rear of the lamp body 10 and a nut 18b (shown in FIG. 2). The conductive layer 11a is electrically communicated with the vehicle body 19 through the stud bolt 18a, which is made of conductive metallic material.

A light chamber is formed by the lamp body 10 and the front lens 16 attached to the front opening of the lamp body. In the light chamber, there are provided a light projection unit 20 for forming a sub-beam of the headlamp and a bulb 34 used for a clearance lamp. The light projection unit 20 is tiltably supported by two aiming screws 12, 13 (shown in FIG. 4) extending forward and supported on the rear side of the lamp body 10 and also supported by an aiming mechanism composed of a ball joint (not shown) attached to the lamp body 10. Reference numeral 14 is a cover made of synthetic resin engaged with the lamp body 10 by means of lances and which is disposed over the light projection unit 20. A mirror surface is formed on the cover 14 by means of aluminum vapor-deposition. A reflector 32 of the clearance lamp 30 is mounted at one side of the cover 14, and a bulb 34 of the clearance lamp attached to the rear wall of lamp body 10 extends through the reflector 32.

The light projection unit 20 includes a substantially elliptical metallic reflector 22, a discharge bulb 40 fitted to a bulb attachment hole 23 formed at the rear top portion of this reflector, and a metallic lens holder 24 for fixing and protecting the projection lens 26 on the front face. The metallic lens holder 24 is attached to the front opening portion of the reflector 22. Reference numeral 25 indicates a locking cap for holding and fixing the discharge bulb 40 at the bulb attaching hole 23.

The discharge bulb 40 is constructed in such a manner that the discharge lamp 44 is supported by a pair of lead supports 42a, 42b protruding from the front face of an insulating base 41. The discharge region of the discharge lamp 44 is disposed at the first focal position $F_1$ of the reflector 22. A cylindrical globe 46, which blocks ultraviolet rays in a harmful wavelength range, surrounds the discharge lamp 44 and is fixed to the front face of the base 41 through a ceramic disk 48. At a position close to the second focal position $F_2$ of the reflector 22, there is provided a shade 28 for the formation of clear-cut line, the shade 28 being integrated with the lens holder 24. There is provided a filter 29 for blocking ultraviolet rays, the filter 29 being held and fixed by the lens holder 24 through a metallic leaf spring 29a. Light emitted from the discharge lamp 44 is reflected by the reflector 22 and converged at the second focal point $F_2$ of the reflector 22. Then, the beam of light is rendered parallel by the projection lens 26 and projected forward.

Reference numeral 50 is a lighting circuit accommodation unit in which the lighting circuit 51 for the discharge bulb is accommodated in a case 52. The lighting circuit accommodation unit 50 is attached at a position at the rear of the lamp body 10. The lighting circuit accommodation unit 50 is constructed in such a manner that a lighting circuit 51 for impressing a high voltage upon an electrode of the discharge lamp 44 so as to continuously effect a stable discharging operation is integrally provided on a printed circuit accommodated in an aluminum case 52. This assembly is then integrated as a single unit by means of resin molding. The lighting circuit 51 is connected to a ballast circuit in a case 70 disposed under the headlamp through a connection cord 72 extending outside the lighting circuit accommodation unit 50. Also, the lighting circuit 51 is connected to the discharge bulb 40 through a lead wire L extending to the front of the case 52. Reference numeral 59 is a female connector connected to the lead wire L. The female connector 59 is connected to a male connector 49 provided in the discharge bulb side.

A cylindrical extension portion 54 made of synthetic resin is fixed to the aluminum unit case 52 of the lighting circuit accommodation unit 50 through a screw 53. This extension portion 54 is engaged in a bayonet-engagement manner with a circular opening 62 formed at the top rear portion of the lamp body 10. The extension portion 54 is fixed to the lamp body 10 through a self-tapping screw 68. A cylindrical rear protruding portion 60 is formed on a rear wall of the lamp body 10 at the rear of the discharge bulb 40. At this position, the circular opening 62 for attaching the unit is formed. At the periphery of the circular opening 62, inside protrusions 63 and cutout portions 63a are formed at three positions equally distributed in the circumferential direction. At the outer periphery of the front end of the extension portion 54, there are provided a flange 55, which contacts the opening periphery, and three outside protrusions 56 engaged in the bayonet-engagement manner with the inside protrusions 63 on the opening side. When the outside protrusions 56 are positioned and inserted into the cutout portions 63a and the lighting circuit accommodation unit 50 is rotated clockwise, the outer and inner protrusions 56, 63 engage each other in the longitudinal direction of the headlamp, so that the extension portion 54 is temporarily held by the opening 62. A ring-shaped seal packing 58 is provided between the outside protrusions 56 on the extension portion side and the inside protrusions 63 on the opening side, so that the bayonet engagement portion is closely contacted and airtightly sealed. The unit case 52 is formed rectangular so that it can be easily handled, and further cutout portions 52a are provided on the outside surface.

At a position close to the protruding portion 60 forming the opening 62, a boss 64 is protruded in which a screw hole 64a is formed. At the flange 55 of the extension portion 54, there is provided a plate-shaped protrusion 57 in which a screw hole 57a is formed. When the unit 50 is engaged in the bayonet engagement manner with the opening 62, the plate-shaped protrusion 57a comes into pressure contact with a protruding end of the boss 64, so that the screw hole 57a rightly coincides with the screw hole 64a. A self-tapping screw 68 is screwed into the screw hole 57a, so that the lighting circuit accommodation unit 50 is fixed in the circumferential direction of the circular opening 62. In the manner described above, the lighting circuit accommodation unit 50 is fixed to the opening portion 62 by means of bayonet engagement of the protrusions 56, 63. In addition, the lighting circuit accommodation unit 50 is fixed to the opening portion 62 by a self-tapping screw 68. Accordingly, even when the headlamp is vibrated, the lighting circuit accommodation unit 50 is positively held in place and disconnection is prevented.

In the same manner as the lamp body 10, the cylindrical extension portion 54b is made of synthetic resin such as PC/ABS alloy and PC/ABS alloy mixed with glass fiber. The outside surface of the extension portion 54 is coated with the same conductive layer 11 (11b) as that (11a) provided on the surface of the lamp body 10. In this case, the conductive layer 11b on the extension portion side is electrically connected to the conductive layer 11a on the lamp body side by the self-tapping screw 68. To be more specific, as illustrated in FIG. 6, the conductive layer 11b₁ formed on the surface of the outside protrusion 57 is held in pressure contact with the conductive layer 11a₁ formed on the front end face of the boss 64 by the self-tapping screw 68, so that the conductive layers 11a and 11b are electrically connected with each other. The aluminum unit case 52, which is a good conductor, is electrically connected to the conductive layer 11b of the extension portion 54 through the screw 53 fastening the case 52 to the extension portion 54, and the unit case 52 is connected to a ground terminal 51a of the ground circuit in the lighting circuit 51 through a lead wire. Due to the foregoing, the conductive layers 11a, 11b surrounding the discharge bulb 40 and lighting circuit 51 for the discharge bulb, and the aluminum unit case 52, which is a conductive layer, are electrically connected to the vehicle body through the ground terminal 51a in the lighting circuit. Accordingly, electromagnetic waves generated by the discharge bulb 40, lighting circuit 51 and lead wire L are transmitted to the ground circuit through the conductive layers 11a, 11b and the unit case 52. Therefore, electrical units outside the headlamp are not disturbed by the noise of such electromagnetic waves. Also, the conductive layers 11a, 11b and the unit case 52 are electrically connected to the vehicle body through the stud bolt 18a. Accordingly, even if the ground terminal 51a of the lighting circuit becomes electrically disconnected from ground, electrical communication is still maintained through the stud bolt 18a, so that the emission of noise-bearing electromagnetic waves still is prevented.

As illustrated in FIG. 6, the conductive layers 11a, 11b are provided even on the relatively sliding surface of the engagement portion between the cylindrical extension portion 54 and the lamp body side opening portion, so that electrical communication between the conductive layers 11a and 11b can be attained. Since the conductive layers 11a and 11b are composed of a metallic plating layer, their surfaces are smooth and their durability is high. Accordingly, when the lighting circuit accommodation unit 50 is attached to and detached from the opening portion 62, the conductive layers 11a and 11b will not be peeled off. Thus, the electromagnetic wave shielding effect is maintained.

Even when electromagnetic waves are generated by other electrical units in the vicinity of the headlamp, such electromagnetic waves are blocked by the conductive layers 11 (11a, 11b) electrically connected to the vehicle body and by the aluminum unit case 52, which functions as a conductive layer. Therefore, the lighting circuit 32 in the lamp body 10 is not affected by electromagnetic waves generated outside the headlamp.

In this connection, this lighting circuit accommodation unit 50 is fixed to the opening portion 62 in the following manner: First, the female connector 59 on the lighting circuit side is connected to the male connector 49 on the bulb side. Then, the lighting circuit accommodation unit 50 is engaged in a bayonet-engagement manner with the opening portion 62, and the unit 50 is temporarily fixed. Next, one self-tapping screw 68 is screwed into the screw hole 57a, and the protrusion 57 is screwed to the boss 64, so that the unit 50 is fixed in the circumferential direction. It is possible to easily conduct this temporary mounting operation of the unit 50 with one hand. In the temporary fixing operation, the screw hole is naturally positioned, so that the self-tapping screw 68 can be easily screwed in.

In the explanation of the above example, the case 52 and the extension portion 54, which are different members, are integrated into one body of the lighting circuit accommodation unit 50. However, the case 52 and the extension portion 54 may be composed of one body. On the other hand, when the case 52 and the extension portion 54 are made as separate units as in this example, there is an advantage in that, by making the size of the extension portion 54 conform to that of the opening portion of the lamp body, the case 52 into which the lighting circuit is integrally accommodated can be applied to various headlamps in common.

Also, in the above example, the self-tapping screw 68 is used for fixing the lighting circuit accommodation unit 50 in the circumferential direction, the screw 68 being engaged with the opening portion 62 in a bayonet manner. However, the fixing arrangement is not limited to a self-tapping screw, but other mechanical fasteners such as a clip and stud bolt may be applied, or alternatively an adhesive agent may be used for fixing the lighting circuit accommodation unit 50.

Figure 7:
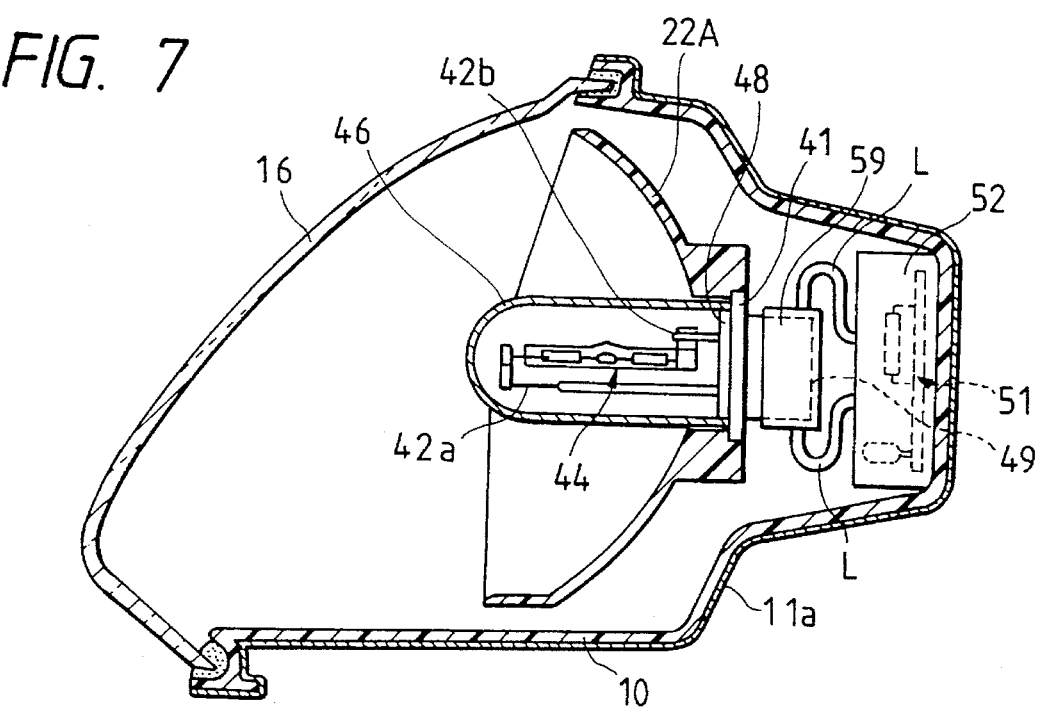
FIG. 7 is a longitudinal sectional view of the headlamp for automobile use of another example of the present invention.
Figure 8:
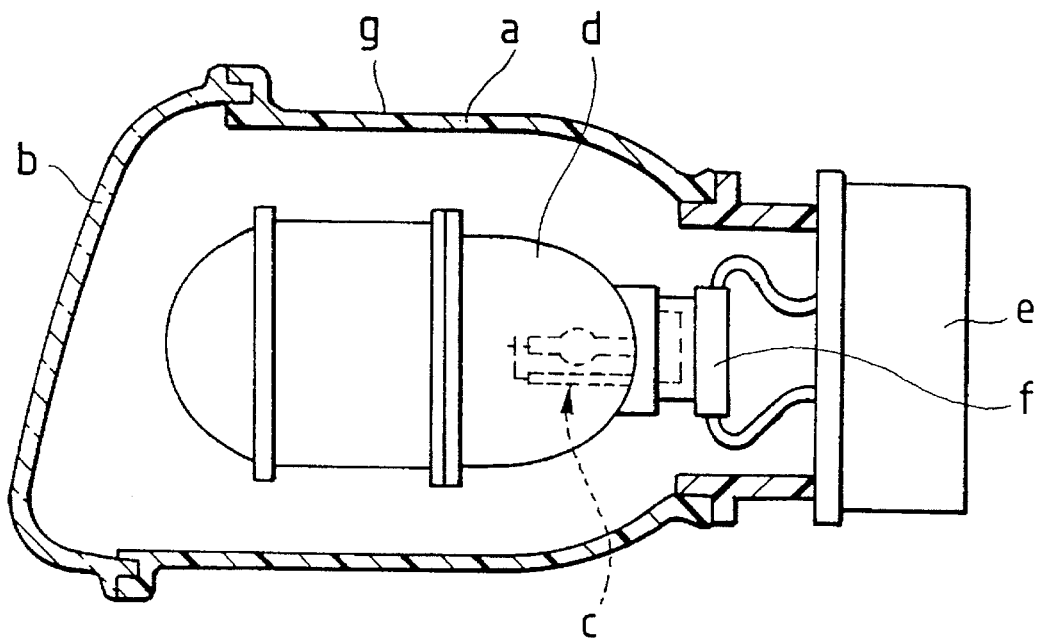
FIG. 8 is an enlarged sectional view showing the structure of the conductive coating layer provided on the surface of the conventional lamp body.
Figure 9:
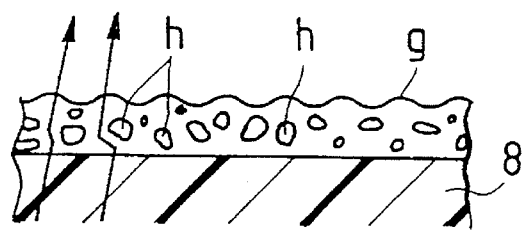
FIG. 9 is a longitudinal sectional view of a conventional headlamp.

FIG. 7 is a longitudinal sectional view of the headlamp of another example of the present invention.

Inside the lamp body 10, a paraboloid-shaped reflector 22A to which the discharge bulb 44 is attached is supported by an aiming mechanism (not shown in the drawing). The external surface of the lamp body 10 is coated with a conductive layer 11a composed of a metallic plating layer. A unit case 52 accommodating a lighting circuit 51 is fixed at a position opposed to the bulb 44 provided inside of the lamp body 10. A lead wire L extending from the lighting circuit 51 in the case 52 is connected with the discharge bulb 44 through a connector 59.

Other elements are substantially the same as those of the example described previously, like parts are identified by the same reference numerals or characters, and a further detailed explanation of such elements is omitted.

As can be understood from the above explanation, according to the headlamp for automobile use of the present invention, the conductive layer provided on the lamp body surface is made of a durable metallic plating layer, which has a thickness uniform over the entire surface of the lamp body. Accordingly, electromagnetic waves generated by the discharge bulb, connector and feeder can be positively blocked over a long period of time.

What is claimed is:

1. In a headlamp for automobile use having a discharge bulb as a light source and a lamp body which is coated with a conductive layer for preventing electromagnetic waves from escaping from the headlamp, the improvement wherein the conductive layer comprises a metal plating layer, wherein said lamp body is made of a thermoplastic resin and wherein said thermoplastic resin is a resin material selected from the group consisting of a polycarbonate/acrylonitrile butadiene styrene alloy mixed with glass fiber, denatured maleimide mixed with glass fiber, and nylon mixed with glass fiber such that said thermoplastic resin has a coefficient of linear expansion close to that of said metal plating layer.

2. In a headlamp for automobile use having a discharge bulb as a light source and a lamp body which is coated with a conductive layer for preventing electromagnetic waves from escaping from the headlamp, the improvement wherein the conductive layer comprises a metal plating layer, wherein said lamp body is made of a thermoplastic resin and wherein said thermoplastic resin is a material selected from the group consisting of denatured maleimide, and nylon mixed with a material selected from the group consisting of alumifisker, mica and talc such that said thermoplastic resin has a coefficient of linear expansion close to that of said metal plating layer.

3. The headlamp of claim 1, wherein said metal plating layer is formed by electrolytic plating.

4. The headlamp of claim 1, wherein said lamp body comprises a stud bolt protruding from a rear thereof for fixing to the vehicle body with a nut, said stud bolt and said nut being made of conductive metallic material, thereby electrically conducting said metal plating layer of said conductive layer to the vehicle body.

5. The headlamp of claim 1, wherein said metal plating layer is formed by the steps of:

subjecting a surface of said lamp body to electroless plating;

electrolytically plating a layer of copper on said lamp body surface subjected to electroless plating;

electrolytically plating a layer of nickel on said layer of copper; and forming a layer of chrome over said layer of nickel.

* * * * *